No. 816,277.  
PATENTED MAR. 27, 1906.  
E. R. TOWNLEY.  
COMBINATION KEYHOLE BIT AND SAW.  
APPLICATION FILED AUG. 21, 1905.
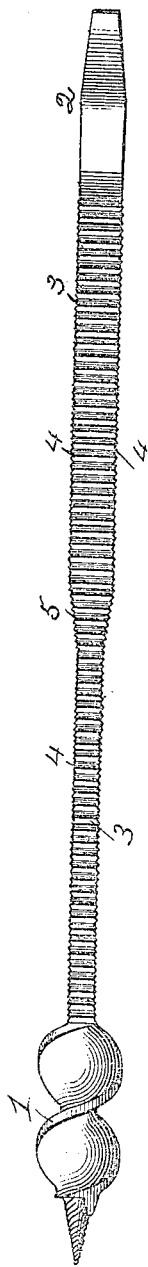
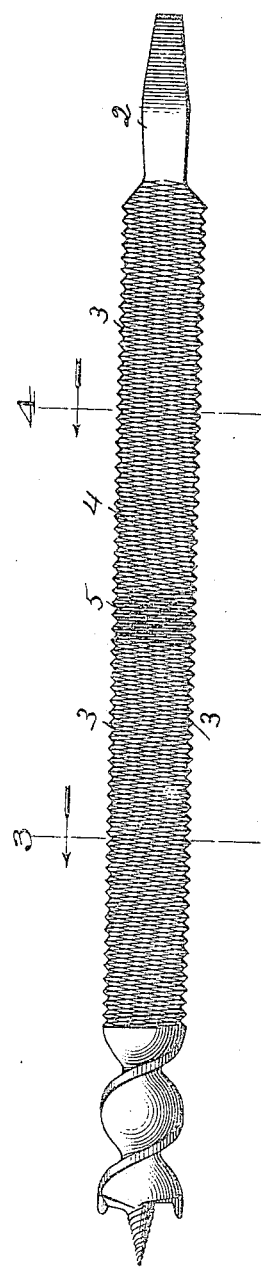
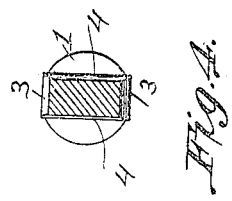
Witnesses:
Inventor,
Early R. Townley

UNITED STATES PATENT OFFICE.

EARLY R. TOWNLEY, OF RONCEVERTE, WEST VIRGINIA.

COMBINATION KEYHOLE BIT AND SAW.

No. 816,277. Specification of Letters Patent. Patented March 27, 1906.

Application filed August 21, 1905. Serial No. 275,176.

*To all whom it may concern:*

Be it known that I, EARLY R. TOWNLEY, a citizen of the United States, residing at Ronceverte, in the county of Greenbrier, in the State of West Virginia, have invented a new and useful Combination Keyhole Bit and Saw, of which the following is a specification.

This invention relates to certain new and useful improvements in combination-tools; and it has for its object to provide a simple implement for use in making keyholes.

I aim to provide in a single element a tool handy for making keyholes, whereby the hole for the circular part may be bored and then the other part formed by reciprocation of the tool without withdrawing the same from the hole, avoiding also the necessity of removing the bit, and then using a different implement, as a saw.

The invention is clearly illustrated in the accompanying drawings, which, with the numerals of reference marked thereon, form a part of this specification, and in which—

Figure 1 is an edge view of the improved implement. Fig. 2 is a view at right angles to Fig. 1. Fig. 3 is a cross-section on the line 3 3 of Fig. 2 looking in the direction of the arrow. Fig. 4 is a cross-section on the line 4 4 of Fig. 2 looking in the direction of the arrow.

Like numerals of reference indicate like parts throughout the several views.

In the drawings, 1 designates the bit or auger designed for boring the round hole. The shank thereof has a polygonal portion 2, designed to be received in the socket of the brace in the usual manner. The shank of the implement is practically flat and is formed upon its edges with saw-teeth 3, while the flat sides of the shank are formed into rasps, as shown at 4. The shank is formed of two different thicknesses, the same being joined by the tapering portion 5, as seen in Figs. 1 and 2, the saw-teeth and the file or rasp surfaces being continuous, as indicated in said views Figs. 3 and 4 show the difference in thickness of the two portions of the shank. This adapts the implement for use in making different-sized keyholes.

The mode of use will be apparent. The bit is employed for forming the round portion of the keyhole, and then by drawing the shank back and forth the elongated or other portion of the keyhole is formed. The rasp may then be used to smooth the sides, and the keyhole is completed by the one operation and by the one tool without removing the bit from the opening which it has formed in the door.

What is claimed as new is—

1. A keyhole-forming implement comprising in a single integral element a bit and a shank formed with teeth upon its edge and its opposite flat faces formed with rasping surfaces.

2. A keyhole-forming implement comprising in a single integral element a bit and a shank having portions of different thickness and formed upon its opposite edges with saw-teeth.

3. A keyhole-forming implement comprising in a single integral element a bit and a shank having portions of different thickness and formed upon its opposite edges with saw-teeth and having its opposite flat faces formed with rasping surfaces.

EARLY R. TOWNLEY.

Witnesses:
J. J. TOWNLEY,
L. L. TOWNLEY.